(12) United States Patent
Natarajan et al.

(10) Patent No.: US 12,489,645 B2
(45) Date of Patent: Dec. 2, 2025

(54) SYSTEM, METHOD, AND COMPUTER PROGRAM PRODUCT FOR SECURING AUTHORIZATION COOKIES AND ACCESS TOKENS

(71) Applicant: Visa International Service Association, San Francisco, CA (US)

(72) Inventors: Balaji Natarajan, Austin, TX (US); Krishnaram Muthusamy, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 114 days.

(21) Appl. No.: 18/684,275

(22) PCT Filed: Aug. 19, 2021

(86) PCT No.: PCT/US2021/046697
§ 371 (c)(1),
(2) Date: Feb. 16, 2024

(87) PCT Pub. No.: WO2023/022719
PCT Pub. Date: Feb. 23, 2023

(65) Prior Publication Data
US 2025/0150287 A1 May 8, 2025

(51) Int. Cl.
*H04L 9/32* (2006.01)
*G06F 21/31* (2013.01)
(Continued)

(52) U.S. Cl.
CPC .......... *H04L 9/3297* (2013.01); *H04L 9/3226* (2013.01); *H04L 9/40* (2022.05)

(58) Field of Classification Search
CPC ....... H04L 9/3297; H04L 9/3226; H04L 9/40; H04L 63/083; H04L 2209/56;
(Continued)

(56) References Cited

U.S. PATENT DOCUMENTS 7,702,909 B2 4/2010 Vainstein
9,596,606 B1 * 3/2017 Palmer ................. G06Q 20/385
(Continued)

OTHER PUBLICATIONS

"API authentication using timestamp: What to do when the client's time setting is changed?", Stackoverflow, 2021, accessed at <https://stackoverflow.com/questions/19431431/api-authentication-using-timestamp-what-to-do-when-the-clients-time-setting-i>.

*Primary Examiner* — Darren B Schwartz
(74) *Attorney, Agent, or Firm* — The Webb Law Firm

(57) ABSTRACT

Systems, methods, and computer program products: determine, a network delay equal to a server system time stamp associated with a system time of a server at which a login request from a user device is received by the server minus a first server system time stamp received in the login request; initiate a session timer from a time equal to the first user system time stamp plus the network delay; transmit, to the user device, an authentication cookie or access token; receive, from the user device, a further request including the authentication cookie or access token and a user system time stamp associated with the system time of the user device; validate, the authentication cookie or access token; determine, a time difference between the user system time stamp plus the network delay and the session timer; and authorize or deny, based on the time difference, the further request.

18 Claims, 7 Drawing Sheets

(51) Int. Cl.
*G06Q 20/10* (2012.01)
*G06Q 20/38* (2012.01)
*G06Q 40/02* (2023.01)
*H04L 9/40* (2022.01)

(58) Field of Classification Search
CPC .......... H04L 2463/121; H04L 63/0807; H04L 9/3213; H04L 63/108; G06F 21/31; G06Q 20/10; G06Q 20/382; G06Q 40/02
See application file for complete search history.

(56) References Cited

U.S. PATENT DOCUMENTS

| | | | |
|---|---|---|---|
| 11,528,153 B1* | 12/2022 | Sajdak | H04W 4/70 |
| 12,072,959 B2* | 8/2024 | Edwards | G06Q 20/40 |
| 12,278,895 B1* | 4/2025 | Stapleton | H04L 63/083 |
| 2005/0160272 A1* | 7/2005 | Teppler | H04L 9/12 713/178 |
| 2007/0239606 A1 | 10/2007 | Eisen | |
| 2010/0004965 A1 | 1/2010 | Eisen | |
| 2010/0088519 A1* | 4/2010 | Tsuruoka | H04L 9/3273 713/176 |
| 2015/0358303 A1* | 12/2015 | Hui | H04L 63/10 726/4 |
| 2016/0352524 A1* | 12/2016 | Kinney | H04L 63/0876 |
| 2017/0230418 A1 | 8/2017 | Amar et al. | |
| 2017/0318008 A1 | 11/2017 | Mead | |
| 2018/0097788 A1* | 4/2018 | Murthy | H04L 63/102 |
| 2020/0342439 A1 | 10/2020 | Lau | |
| 2021/0083873 A1 | 3/2021 | Harris | |
| 2021/0288808 A1* | 9/2021 | Bahety | H04L 9/3247 |
| 2021/0297449 A1* | 9/2021 | Pasion | H04L 63/0807 |
| 2022/0417241 A1* | 12/2022 | Zilbershtein | H04L 9/3247 |
| 2023/0239324 A1* | 7/2023 | Shetty | H04L 63/0807 713/151 |

* cited by examiner

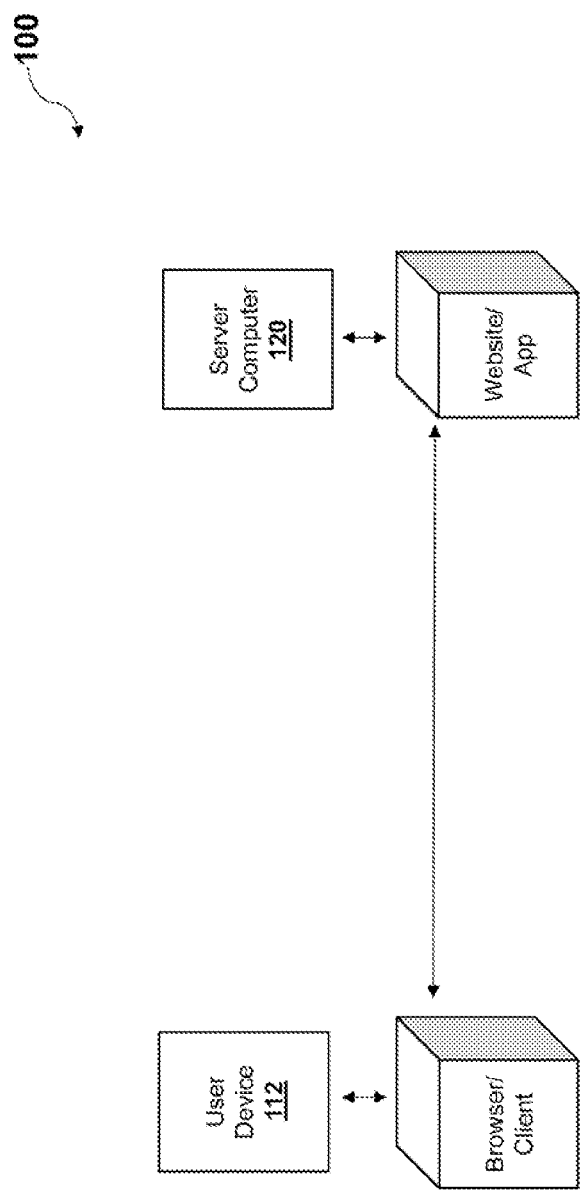

SYSTEM, METHOD, AND COMPUTER PROGRAM PRODUCT FOR SECURING AUTHORIZATION COOKIES AND ACCESS TOKENS

CROSS-REFERENCE TO RELATED APPLICATION

This application is the United States national phase of International Application No. PCT/US2021/046697 filed Aug. 19, 2021 the entire disclosure of which is hereby incorporated by reference in its entirety.

BACKGROUND

1. Technical Field

This disclosure relates to electronic payment networks and, in some non-limiting embodiments or aspects, to securing authentication (or authorization) cookies and access tokens for authentication and/or authorization of users.

2. Technical Considerations

The moving of commerce online combined with an increasingly tech-savvy generation, continuing economic uncertainty, and a lack of controls are creating fertile ground for fraud. The move online is positive for both companies and their customers, because online payments can be used to help build a holistic view of a customer. With customers' growing preferences for mobile devices, there are opportunities for enhancing customer service delivery by offering new services, such as faster payments. However, digital channels are more vulnerable to fraud. Although the speed and openness of the digital approach makes e-commerce and online banking more convenient, it can also enable fraudsters to more easily access money, and transfer the money more quickly, without being detected.

The increasing capability of fraudsters may be reflected in the variety of schemes they use. Among the most prevalent schemes used by fraudsters are phishing schemes, in which fraudsters send emails impersonating legitimate companies, and vishing schemes, a form of voice phishing that requires the intended victim to respond by telephone to an email or phone message. Malware is also ubiquitous—with schemes becoming so well executed that it can be almost impossible for users to recognize that their devices have been infected. Money mules, people recruited by the fraudsters to transfer money acquired illegally, also contribute to the success of many online frauds.

A lack of a consistent pattern to fraudulent activity may make the activity even more challenging for authorities to analyze. Banks and/or e-commerce providers can be attacked repeatedly for a period and react by putting new controls in place, which causes activity to typically drop away, only to return months later once the fraudsters have developed new modus operandi to bypass the controls.

Although offering a diverse portfolio of financial products in an environment where fraud is fast paced and forever changing, most e-commerce providers and banks have little in the way of viable technology to provide much-needed protection from fraudulent schemes. For example, e-commerce providers and banks may be overly reliant on authentication systems that provide unambiguous identification of users through a combination of components known only to that user, such as user names and/or personal identification numbers (PINs).

With new fraud types emerging constantly, companies should take a more sophisticated approach to online fraud detection, as well as be in a state of constant readiness. Careful data monitoring and management may be needed from the outset, and companies should enhance their data quality and collate and link different data types coming into the organization. Because fraud methods are continuously evolving, systems should allow users to quickly configure new scenarios, and modify existing behavioral patterns. However, the impact on fraud levels, and the false positives they'll generate, should always be understood. To gain this knowledge, systems should allow users to effectively simulate changes across large volumes of historical data and deploy results into production environments instantly. Further detection techniques can also be added at this stage. These further detection techniques may include anomaly detection to determine new potential areas of fraud and/or predictive analytics, in which historical information is used to identify suspicious behavior. Social network analytics may also be deployed in this context to help establish links between money mules and fraudster groups.

By using this hybrid of analytics methods, fraud cases may be detected early and accurately. In fact, time is of the essence throughout the fraud detection process, and a fraud detection system may be required to identify high-risk transactions in real time, to potentially block the transaction and route the transactions for review by relevant investigators. However, fraud detection may not rely on technology alone, and users may be empowered to spot new trends and emerging operating methods by putting data in the hands of the users, thereby enabling them to quickly drill down to explore areas of risk not previously considered. This gives users the power to ask questions on the fly, without the need to rely on IT, and with the results presented in a user-friendly and visual way, and knowledge gained may be fed back into ongoing detection models, enabling systems to stay ahead of the curve.

Fraudsters are currently setting the pace in the long-term battle with companies and the rate of online fraud is increasing, with inventive criminal gangs continuing to develop new fraud types in order to endlessly probe companies' defenses. In this complex environment, financial institutions increasingly benefit from a hybrid analytics approach, which enables them to understand today's challenges and implement technology to address these challenges, while constantly evolving to counteract ever-changing threats.

Identity theft continues to pose challenges for consumers as criminals develop new mechanisms to commit fraud. According to the 2019 Identity Fraud Study from Javelin Strategy & Research, the number of consumers who were victims of identity fraud fell to 14.4 million in 2018, down from a record high of 16.7 million in 2017. However, identity fraud victims in 2018 bore a heavier financial burden: 3.3 million people were responsible for some of the liability of the fraud committed against them, nearly three times as many as in 2016. Moreover, these victims' out-of-pocket fraud costs more than doubled from 2016 to 2018 to $1.7 billion. New account fraud losses also rose slightly, with criminals beginning to focus their attention on different financial accounts, such as loyalty and rewards programs and retirement accounts. Additionally, criminals are becoming adept at foiling authentication processes, particularly mobile phone account takeovers. These takeovers nearly doubled to 680,000 victims in 2018, compared with 380,000 in 2017. The study does note that the shift to embedded chip cards is helping to contain existing card fraud, which showed the steepest decline of any fraud type in 2018, with losses at $14.7 billion in 2018, down from $16.8 billion in 2017.

The Consumer Sentinel Network, maintained by the Federal Trade Commission (FTC), tracks consumer fraud and identity theft complaints that have been filed with federal, state and local law enforcement agencies and private organizations. Of the 3.2 million identity theft and fraud reports received in 2019, 1.7 million were fraud-related, about 900,000 were other consumer complaints, and about 651,000 were identity theft complaints. Of the 1.7 million fraud cases, 23 percent reported money was lost. In 2019, consumers reported losing more than $1.9 billion related to fraud complaints, an increase of $293 million from 2018. The median amount consumers paid in these cases was $320. Within the fraud category, imposter scams were the most reported and ranked first among the top 10 fraud categories identified by the FTC. They accounted for $667 million in losses. In 2019, 650,570 or 20 percent of all complaints, were related to identity theft. Identity theft claims fell from 2015 to 2017 by 24 percent but began to increase again in 2018 and were up 46 percent from 2018 to 2019.

SUMMARY

Accordingly, provided are improved systems, devices, products, apparatus, and/or methods for securing authentication cookies and access tokens.

According to some non-limiting embodiments or aspects, provided is a computer-implemented method, comprising: receiving, with a server including at least one processor, from a user device, a login request, wherein the login request includes user information, a first user system time stamp associated with a system time of the user device, and a first server system time stamp associated with a system time of the server; validating, with the server, the user information; in response to validating the user information, determining, with the server, a network delay, wherein the network delay is equal to a second server system time stamp associated with the system time of the server at which the login request is received by the server minus the first server system time stamp; initiating, with the server, a session timer associated with the user device, wherein the session timer is initiated from a time equal to the first user system time stamp plus the network delay; transmitting, with the server, to the user device, an authentication cookie or access token; receiving, with the server, from the user device, a further request, wherein the further request includes the authentication cookie or access token and a second user system time stamp associated with the system time of the user device; validating, with the server, the authentication cookie or access token included in the further request; in response to validating the authentication cookie or access token, determining, with the server, a time difference between the second user system time stamp plus the network delay and a current time of the session timer; and at least one of authorizing, challenging, and denying, with the server, based on the time difference, the further request.

In some non-limiting embodiments or aspects, the method further comprises: receiving, with the server, from the user device, a registration request, wherein the registration request includes the user information, wherein the user information includes a user name and a password; hashing, with the server, the password; and storing, with the server, in a database, the hashed password in association with the user name, wherein the server validates the user information by hashing the password included in the login request, comparing the hashed password included in the login request to the hashed password stored in the database in association with the user name, and validating the user information in response to the hashed passwords matching each other.

In some non-limiting embodiments or aspects, the method further comprises: generating, with the server, a device identifier associated with the user device; generating, with the server, a browser or client identifier associated with a browser or client of the user device; generating, with the server, based on the user name, the device identifier, and the browser identifier, using an encryption code, the authentication cookie or access token; and storing, with the server, in the database, the authentication cookie or access token in association with the user name, the device identifier, and the browser identifier, wherein the server validates the authentication cookie or access token included in the further request by comparing the authentication cookie or access token included in the further request to the authentication cookie or access token stored in the database in association with the user name, the device identifier, and the browser identifier.

In some non-limiting embodiments or aspects, the at least one of authorizing, challenging, and denying based on the time difference, the further request further includes: determining whether the time difference satisfies at least one threshold time; in response to determining that the time difference satisfies the at least one threshold time, authorizing the further request; and in response to determining that the time difference fails to satisfy the at least one threshold time, denying the further request.

In some non-limiting embodiments or aspects, the at least one threshold time includes a first threshold time and a second threshold time, and wherein the at least one of authorizing, challenging, and denying based on the time difference, the further request further includes: in response to determining that the time difference satisfies the first threshold time and fails to satisfy the second threshold time, challenging the further request by performing a two-factor authentication process with the user device.

In some non-limiting embodiments or aspects, the further request includes one or more invalid random time stamps, and wherein the second user system time stamp and the one or more invalid random time stamps are encrypted with a predetermined encryption code.

According to some non-limiting embodiments or aspects, provided is a system, comprising: a server including at least one processor programmed and/or configured to: receive, from a user device, a login request, wherein the login request includes user information, a first user system time stamp associated with a system time of the user device, and a first server system time stamp associated with a system time of the server; validate the user information; in response to validating the user information, determine, a network delay, wherein the network delay is equal to a second server system time stamp associated with the system time of the server at which the login request is received by the server minus the first server system time stamp; initiate a session timer associated with the user device, wherein the session timer is initiated from a time equal to the first user system time stamp plus the network delay; transmit, to the user device, an authentication cookie or access token; receive, from the user device, a further request, wherein the further request includes the authentication cookie or access token and a second user system time stamp associated with the system time of the user device; validate the authentication cookie or access token included in the further request; in response to validating the authentication cookie or access token, determine a time difference between the second user system time stamp plus the network delay and a current time of the session timer; and at least one of authorize, challenge, and deny, based on the time difference, the further request.

In some non-limiting embodiments or aspects, the server including the at least one processor is further programmed and/or configured to: receive, from the user device, a registration request, wherein the registration request includes the user information, wherein the user information includes a user name and a password; hash the password; and store, in a database, the hashed password in association with the user name, wherein the server including the at least one processor validates the user information by hashing the password included in the login request, comparing the hashed password included in the login request to the hashed password stored in the database in association with the user name, and validating the user information in response to the hashed passwords matching each other.

In some non-limiting embodiments or aspects, the server including the at least one processor is further programmed and/or configured to: generate a device identifier associated with the user device; generate a browser or client identifier associated with a browser or client of the user device; generate, based on the user name, the device identifier, and the browser identifier, using an encryption code, the authentication cookie or access token; and store, in the database, the authentication cookie or access token in association with the user name, the device identifier, and the browser identifier, wherein the server including the at least one processor validates the authentication cookie or access token included in the further request by comparing the authentication cookie or access token included in the further request to the authentication cookie or access token stored in the database in association with the user name, the device identifier, and the browser identifier.

In some non-limiting embodiments or aspects, the server including the at least one processor is further programmed and/or configured to: determine whether the time difference satisfies at least one threshold time; in response to determining that the time difference satisfies the at least one threshold time, authorize the further request; and in response to determining that the time difference fails to satisfy the at least one threshold time, deny the further request.

In some non-limiting embodiments or aspects, the at least one threshold time includes a first threshold time and a second threshold time, and wherein the server including the at least one processor is further programmed and/or configured to: in response to determining that the time difference satisfies the first threshold time and fails to satisfy the second threshold time, challenge the further request by performing a two-factor authentication process with the user device.

In some non-limiting embodiments or aspects, the further request includes one or more invalid random time stamps, and wherein the second user system time stamp and the one or more invalid random time stamps are encrypted with a predetermined encryption code.

According to some non-limiting embodiments or aspects, provided is a computer program product comprising at least one non-transitory computer-readable medium including program instructions that, when executed by at least one processor, cause the at least one processor to: receive, from a user device, a login request, wherein the login request includes user information, a first user system time stamp associated with a system time of the user device, and a first server system time stamp associated with a system time of a server; validate the user information; in response to validating the user information, determine, a network delay, wherein the network delay is equal to a second server system time stamp associated with the system time of the server at which the login request is received by the server minus the first server system time stamp; initiate a session timer associated with the user device, wherein the session timer is initiated from a time equal to the first user system time stamp plus the network delay; transmit, to the user device, an authentication cookie or access token; receive, from the user device, a further request, wherein the further request includes the authentication cookie or access token and a second user system time stamp associated with the system time of the user device; validate, the authentication cookie or access token included in the further request; in response to validating the authentication cookie or access token, determine, a time difference between the second user system time stamp plus the network delay and a current time of the session timer; and at least one of authorize, challenge, and deny, based on the time difference, the further request.

In some non-limiting embodiments or aspects, the program instructions further cause the at least one processor to: receive, from the user device, a registration request, wherein the registration request includes the user information, wherein the user information includes a user name and a password; hash the password; store, in a database, the hashed password in association with the user name; and validate the user information by hashing the password included in the login request, comparing the hashed password included in the login request to the hashed password stored in the database in association with the user name, and validating the user information in response to the hashed passwords matching each other.

In some non-limiting embodiments or aspects, the program instructions further cause the at least one processor to: generate a device identifier associated with the user device; generate a browser or client identifier associated with a browser or client of the user device; generate, based on the user name, the device identifier, and the browser identifier, using an encryption code, the authentication cookie or access token; store, in the database, the authentication cookie or access token in association with the user name, the device identifier, and the browser identifier; and validate the authentication cookie or access token included in the further request by comparing the authentication cookie or access token included in the further request to the authentication cookie or access token stored in the database in association with the user name, the device identifier, and the browser identifier.

In some non-limiting embodiments or aspects, the program instructions further cause the at least on processor to: determine whether the time difference satisfies at least one threshold time; in response to determining that the time difference satisfies the at least one threshold time, authorize the further request; and in response to determining that the time difference fails to satisfy the at least one threshold time, deny the further request.

In some non-limiting embodiments or aspects, the at least one threshold time includes a first threshold time and a second threshold time, and wherein the program instructions further cause the at least one processor to: in response to determining that the time difference satisfies the first threshold time and fails to satisfy the second threshold time, challenge the further request by performing a two-factor authentication process with the user device.

In some non-limiting embodiments or aspects, the further request includes one or more invalid random time stamps, and wherein the second user system time stamp and the one or more invalid random time stamps are encrypted with a predetermined encryption code.

Further non-limiting embodiments or aspects are set forth in the following numbered clauses:

Clause 1. A computer-implemented method, comprising: receiving, with a server including at least one processor, from a user device, a login request, wherein the login request includes user information, a first user system time stamp associated with a system time of the user device, and a first server system time stamp associated with a system time of the server; validating, with the server, the user information; in response to validating the user information, determining, with the server, a network delay, wherein the network delay is equal to a second server system time stamp associated with the system time of the server at which the login request is received by the server minus the first server system time stamp; initiating, with the server, a session timer associated with the user device, wherein the session timer is initiated from a time equal to the first user system time stamp plus the network delay; transmitting, with the server, to the user device, an authentication cookie or access token; receiving, with the server, from the user device, a further request, wherein the further request includes the authentication cookie or access token and a second user system time stamp associated with the system time of the user device; validating, with the server, the authentication cookie or access token included in the further request; in response to validating the authentication cookie or access token, determining, with the server, a time difference between the second user system time stamp plus the network delay and a current time of the session timer; and at least one of authorizing, challenging, and denying, with the server, based on the time difference, the further request.

Clause 2. The computer-implemented method of clause 1, further comprising: receiving, with the server, from the user device, a registration request, wherein the registration request includes the user information, wherein the user information includes a user name and a password; hashing, with the server, the password; and storing, with the server, in a database, the hashed password in association with the user name, wherein the server validates the user information by hashing the password included in the login request, comparing the hashed password included in the login request to the hashed password stored in the database in association with the user name, and validating the user information in response to the hashed passwords matching each other.

Clause 3. The computer-implemented method of clauses 1 or 2, further comprising: generating, with the server, a device identifier associated with the user device; generating, with the server, a browser or client identifier associated with a browser or client of the user device; generating, with the server, based on the user name, the device identifier, and the browser identifier, using an encryption code, the authentication cookie or access token; and storing, with the server, in the database, the authentication cookie or access token in association with the user name, the device identifier, and the browser identifier, wherein the server validates the authentication cookie or access token included in the further request by comparing the authentication cookie or access token included in the further request to the authentication cookie or access token stored in the database in association with the user name, the device identifier, and the browser identifier.

Clause 4. The computer-implemented method of any of clauses 1-3, wherein the at least one of authorizing, challenging, and denying based on the time difference, the further request further includes: determining whether the time difference satisfies at least one threshold time; in response to determining that the time difference satisfies the at least one threshold time, authorizing the further request; and in response to determining that the time difference fails to satisfy the at least one threshold time, denying the further request.

Clause 5. The computer-implemented method of any of clauses 1-4, wherein the at least one threshold time includes a first threshold time and a second threshold time, and wherein the at least one of authorizing, challenging, and denying based on the time difference, the further request further includes: in response to determining that the time difference satisfies the first threshold time and fails to satisfy the second threshold time, challenging the further request by performing a two-factor authentication process with the user device.

Clause 6. The computer-implemented method of any of clauses 1-5, wherein the further request includes one or more invalid random time stamps, and wherein the second user system time stamp and the one or more invalid random time stamps are encrypted with a predetermined encryption code.

Clause 7. A system, comprising: a server including at least one processor programmed and/or configured to: receive, from a user device, a login request, wherein the login request includes user information, a first user system time stamp associated with a system time of the user device, and a first server system time stamp associated with a system time of the server; validate the user information; in response to validating the user information, determine, a network delay, wherein the network delay is equal to a second server system time stamp associated with the system time of the server at which the login request is received by the server minus the first server system time stamp; initiate a session timer associated with the user device, wherein the session timer is initiated from a time equal to the first user system time stamp plus the network delay; transmit, to the user device, an authentication cookie or access token; receive, from the user device, a further request, wherein the further request includes the authentication cookie or access token and a second user system time stamp associated with the system time of the user device; validate the authentication cookie or access token included in the further request; in response to validating the authentication cookie or access token, determine a time difference between the second user system time stamp plus the network delay and a current time of the session timer; and at least one of authorize, challenge, and deny, based on the time difference, the further request.

Clause 8. The system of clause 7, wherein the server including the at least one processor is further programmed and/or configured to: receive, from the user device, a registration request, wherein the registration request includes the user information, wherein the user information includes a user name and a password; hash the password; and store, in a database, the hashed password in association with the user name, wherein the server including the at least one processor validates the user information by hashing the password included in the login request, comparing the hashed password included in the login request to the hashed password stored in the database in association with the user name, and validating the user information in response to the hashed passwords matching each other.

Clause 9. The system of clauses 7 or 8, wherein the server including the at least one processor is further programmed and/or configured to: generate a device identifier associated with the user device; generate a browser or client identifier associated with a browser or client of the user device; generate, based on the user name, the device identifier, and the browser identifier, using an encryption code, the authentication cookie or access token; and store, in the database, the authentication cookie or access token in association with the user name, the device identifier, and the browser identifier, wherein the server including the at least one processor validates the authentication cookie or access token included in the further request by comparing the authentication cookie or access token included in the further request to the authentication cookie or access token stored in the database in association with the user name, the device identifier, and the browser identifier.

Clause 10. The system of any of clauses 7-9, wherein the server including the at least one processor is further programmed and/or configured to: determine whether the time difference satisfies at least one threshold time; in response to determining that the time difference satisfies the at least one threshold time, authorize the further request; and in response to determining that the time difference fails to satisfy the at least one threshold time, deny the further request.

Clause 11. The system of any of clauses 7-10, wherein the at least one threshold time includes a first threshold time and a second threshold time, and wherein the server including the at least one processor is further programmed and/or configured to: in response to determining that the time difference satisfies the first threshold time and fails to satisfy the second threshold time, challenge the further request by performing a two-factor authentication process with the user device.

Clause 12. The system of any of clauses 7-11, wherein the further request includes one or more invalid random time stamps, and wherein the second user system time stamp and the one or more invalid random time stamps are encrypted with a predetermined encryption code.

Clause 13. A computer program product comprising at least one non-transitory computer-readable medium including program instructions that, when executed by at least one processor, cause the at least one processor to: receive, from a user device, a login request, wherein the login request includes user information, a first user system time stamp associated with a system time of the user device, and a first server system time stamp associated with a system time of a server; validate the user information; in response to validating the user information, determine, a network delay, wherein the network delay is equal to a second server system time stamp associated with the system time of the server at which the login request is received by the server minus the first server system time stamp; initiate a session timer associated with the user device, wherein the session timer is initiated from a time equal to the first user system time stamp plus the network delay; transmit, to the user device, an authentication cookie or access token; receive, from the user device, a further request, wherein the further request includes the authentication cookie or access token and a second user system time stamp associated with the system time of the user device; validate, the authentication cookie or access token included in the further request; in response to validating the authentication cookie or access token, determine, a time difference between the second user system time stamp plus the network delay and a current time of the session timer; and at least one of authorize, challenge, and deny, based on the time difference, the further request.

Clause 14. The computer program product of clause 13, wherein the program instructions further cause the at least one processor to: receive, from the user device, a registration request, wherein the registration request includes the user information, wherein the user information includes a user name and a password; hash the password; store, in a database, the hashed password in association with the user name; and validate the user information by hashing the password included in the login request, comparing the hashed password included in the login request to the hashed password stored in the database in association with the user name, and validating the user information in response to the hashed passwords matching each other.

Clause 15. The computer program product of clauses 13 or 14, wherein the program instructions further cause the at least one processor to: generate a device identifier associated with the user device; generate a browser or client identifier associated with a browser or client of the user device; generate, based on the user name, the device identifier, and the browser identifier, using an encryption code, the authentication cookie or access token; store, in the database, the authentication cookie or access token in association with the user name, the device identifier, and the browser identifier; and validate the authentication cookie or access token included in the further request by comparing the authentication cookie or access token included in the further request to the authentication cookie or access token stored in the database in association with the user name, the device identifier, and the browser identifier.

Clause 16. The computer program product of any of clauses 13-15, wherein the program instructions further cause the at least on processor to: determine whether the time difference satisfies at least one threshold time; in response to determining that the time difference satisfies the at least one threshold time, authorize the further request; and in response to determining that the time difference fails to satisfy the at least one threshold time, deny the further request.

Clause 17. The computer program product of any of clauses 13-16, wherein the at least one threshold time includes a first threshold time and a second threshold time, and wherein the program instructions further cause the at least one processor to: in response to determining that the time difference satisfies the first threshold time and fails to satisfy the second threshold time, challenge the further request by performing a two-factor authentication process with the user device.

Clause 18. The computer program product of any of clauses 13-17, wherein the further request includes one or more invalid random time stamps, and wherein the second user system time stamp and the one or more invalid random time stamps are encrypted with a predetermined encryption code.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which:

FIGS. 1A and 1B are diagrams of non-limiting embodiments or aspects of an environment in which systems, devices, products, apparatus, and/or methods, described herein, may be implemented;

DETAILED DESCRIPTION

Figure 1A:
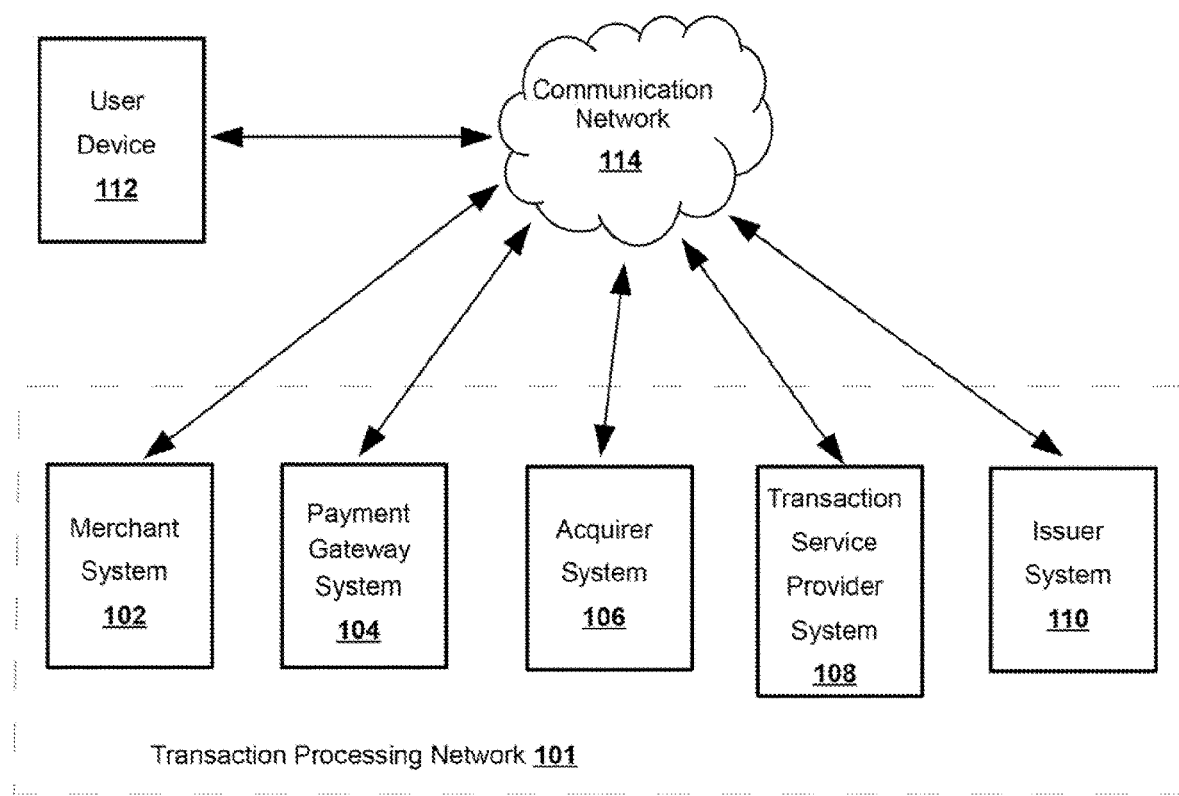

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Either cookie-based authentication or token-based authentication is a part of almost all e-commerce, banking, and financial websites. Cookie-based authentication and token-based authentication help to reduce friction or stress associated with e-commerce transactions. For example, authentication (or authorization) cookies and access tokens enable authenticating a user and authorizing a transaction associated with the user without asking the user to enter a password and/or a one-time password (OTP) with the goal of minimizing customer friction and improving the user experience during checkouts and other transactions.

A cookie may be considered as an item in a dictionary. Each item in the dictionary may have a key and a value. For authentication, the key may be a "user name" and the value may be the user name for that key (e.g., an email address, etc.). Each time a browser sends a request to a website, the browser may include the cookies associated with that website in the request, and the host server may check the cookies received from the browser to automatically authenticate the user.

To set a cookie, the server may add the cookie to a response that the server sends back after a request, and the browser may automatically add the cookie upon receiving the response including the cookie. There are different options that can be configured for the cookie at the server-side, such as expiration times, encryption, and/or the like.

An encrypted cookie may often be referred to as a signed cookie. For example, the server encrypts the key and value in the dictionary item such that only the server can make use of the information, which makes the cookie secure.

A browser may save the cookies set by the server. The browser may add the cookies in an HTTP header of each request that the browser makes to that server. For example, the browser may only add the cookies to requests for the domains that set the cookies. As an example, example.com may set a cookie and add options in the HTTP header for the browser to send the cookie back to subdomains, such as sub.example.com. It is typically considered unacceptable for a browser to send cookies to a different domain than from which the cookies are set.

Before a user can be authenticated by a server, a browser or client of the user posts a HTTP request including a user name and a password associated with the user to the server to register or sign up the user with the server. The server may receive the HTTP request and hash the password before storing the user name and the password in a database, which may prevent a malicious entity that gains access to the database seeing the actual passwords. The server may return, to the browser, a HTTP 200 OK success status response code that indicates the request has succeeded.

Figures 4A, 4B:
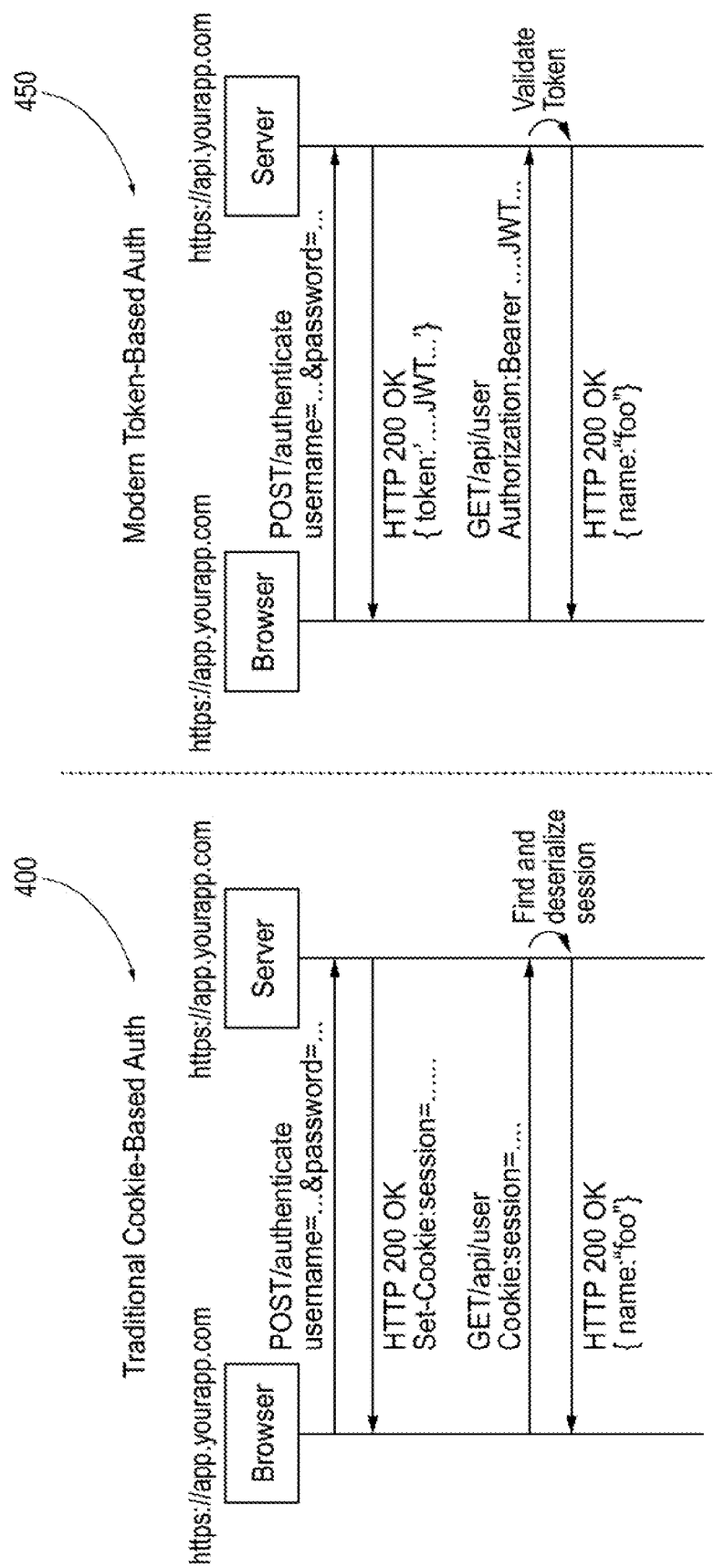
FIG. 4A is a signal flow diagram of an existing process for cookie-based authentication.
FIG. 4B is a signal flow diagram of an existing process for token-based authentication.

Referring now to FIG. 4A, FIG. 4A is a signal flow diagram of an existing process 400 for cookie-based authentication. As shown in FIG. 4A, after the user registers with the server, the browser may post another HTTP request including the user name and the password associated with the user to the server to log the user into the server. The server looks up the user name in the database, hashes the password received in the HTTP request, and compares the hashed password to the hash of the password stored in the database in association with the user name. If the passwords do not match, the server may deny the user access by sending a 401 status code and ending the request. If the passwords match, the server may create an access token that uniquely identifies a session of the user. The server may store the access token in the database in association with the user name and attach the access token to a response cookie to be returned to the client. The access token may include an expiration date and/or time to limit the session of the user. The server may return the access token attached to the response cookie to the client in a HTTP 200 OK success status response code. For example, from this point on, the cookie including the access token may be attached to each request and response made between the browser and the server.

As further shown in FIG. 4A, each time the browser or client makes a request for a page or data that requires authorization (e.g., the user is required to be logged in to the server to access the data, etc.), the browser may include the cookie including the access token in the request to the server (e.g., a GET request, etc.), and the server may obtain the access token from the cookie and compare the access token received in the cookie to the access token stored in the database in association with the user name of the user. If the access tokens match, the server may grant access to the requested page or data to the browser or client.

Token-based authentication often uses the JavaScript Object Notation (JSON) Web Token (JWT) because the JWT is widely used in all industries and is a de-facto standard for authentication. JWT is an open standard that defines a compact, secure, and self-contained mechanism to transmit data between parties in JSON. JWT is a stateless type of authentication, which means that the server does not store any session information in the database of the server, and the server does not need to keep a record of which user has logged in or which token is issued for which user. Instead, the browser or client sends subsequent requests to the server with a header in the format of bearer-{JWT-token}, or more often, the client sends the JWT-token in the body of a POST request or as a URL parameter.

Referring now to FIG. 4B, FIG. 4B is a signal flow diagram of an existing process 450 for cookie-based authentication. As shown in FIG. 4B, a browser or client may post a HTTP request including the user name and the password associated with a user to a server to log the user into the server. The server may verify the user name and the password of the user, create and store a signed token associated with the user name or client, and transmit the signed token back to the browser or client. The browser or client may store the signed token in local storage and/or session storage on the browser/client-side.

As further shown in FIG. 4B, each time the browser or client makes a subsequent request to the server, the browser may include the signed token in the request to the server (e.g., a GET request, etc.). For example, the browser or client may embed the signed token in the header of the request in the format of bearer-{JWT-token}. The server may obtain the signed token from the request and compare the signed token received in the request to the signed token stored in the database in association with the user name or client. If the signed tokens match, the server may grant access to the requested page or data to the browser or client. After the user logs out, the token is destroyed on the client-side by the browser or client without requiring any interaction with the server because the server is stateless.

Figure 5:
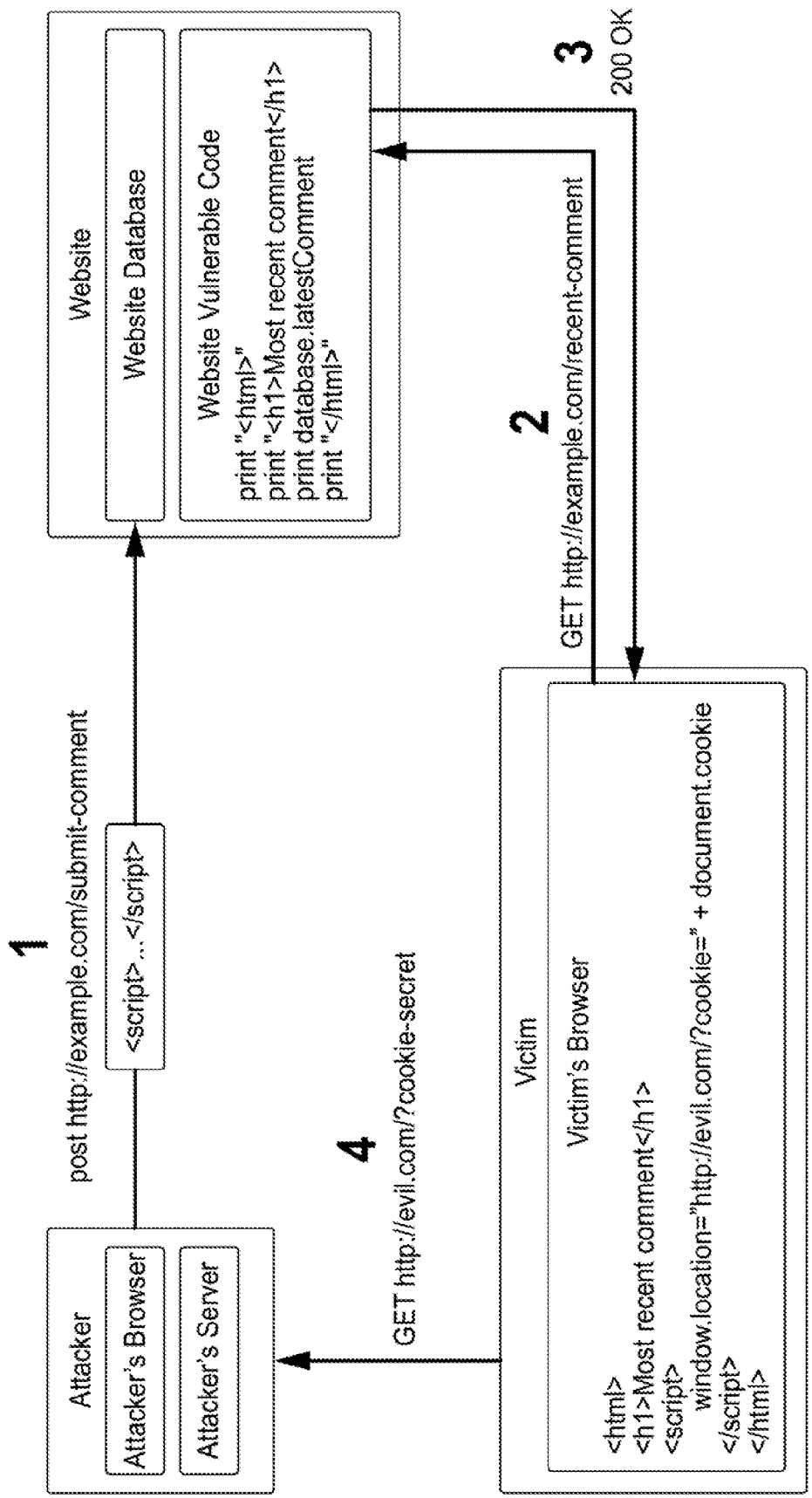
FIG. 5 is a signal flow diagram of an example cross site scripting (XSS) attack.

Two of the most common attack vectors facing websites and applications are cross site scripting (XSS) and cross-site request forgery (XSRF or CSRF). XSS attacks occur when an outside entity is able to execute code within a website or application. The most common attack vector for XSS attacks is websites or applications that allow inputs that are not properly sanitized. If an attacker can execute code on a domain of a website or application, cookies and/or JWT tokens associated with that domain are vulnerable. For example, and referring now to FIG. 5, FIG. 5 is a signal flow diagram of an example XSS attack 500. As shown in FIG. 5, at reference number 1, an attacker may insert a malicious script or code into a vulnerable website. At reference number 2, a browser of a victim makes a request to access the website. At reference number 3, the browser of the victim receives a response including an authentication cookie including an access token from the website. The malicious script is also hidden in the response and, at reference number 4, the malicious script causes the browser of the victim and/or the website to provide the authentication cookie to a server controlled by the attacker and from which the attacker can access the stolen authentication cookie (e.g., via a browser of the attacker, etc.).

Accordingly, from XSS attacks to viruses embedded in seemingly harmless software, modern hackers use multiple tools to hijack sessions of unsuspecting users. Many of these advanced attacks require background knowledge and expertise in networking protocols, software development, and web technologies to carry out the attacks. However, the use of simple tools over a local LAN is one of the easiest ways to steal cookies from average users, and getting access to a local LAN may be relatively easy for attackers, because it is relatively easy to crack most wireless encryption protocols.

Cookies and access tokens are typically valid for a certain time set by the website or application that issues the token (e.g., typically varying from a minute to 6 months, etc.), thereby giving different users different access levels from low to high. During this time when a cookie or access token is valid, a stolen authentication cookie or a stolen access token becomes a serious security threat by which a fraudster may recreate the session with the stolen authentication cookie or access token and continue with fraudulent activities on the website or application. For example, if an original expiry time of an authentication cookie or access token is sixty minutes, a fraudster can create a new session within this sixty minute time frame using a browser, and/or with the help of script, directly attack APIs exposed by the application. Accordingly, the longer the authentication cookie or access token expiration duration, the higher the threat and more opportunities for the fraudster to exploit.

E-commerce stay signed in (SSI), enhanced remember me (ERM) flows, express or one-click checkout, and various other e-commerce flows use authentication cookie and token-based authentication to improve checkout experience by reducing customer friction. In these scenarios, e-commerce, financial, and other business-to-consumer (B2C) webpages and applications cannot differentiate if an authentication cookie or an access token received from a browser or client is coming from a legitimate user-device-browser combo or from a fraudster.

Provided are improved systems, devices, products, apparatus, and/or methods for securing authentication cookies and access tokens that receive, from a user device, a login request, wherein the login request includes user information, a first user system time stamp associated with a system time of the user device, and a first server system time stamp associated with a system time of a server; validate the user information; in response to validating the user information, determine, a network delay, wherein the network delay is equal to a second server system time stamp associated with the system time of the server at which the login request is received by the server minus the first server system time stamp; initiate a session timer associated with the user device, wherein the session timer is initiated from a time equal to the first user system time stamp plus the network delay; transmit, to the user device, an authentication cookie or access token; receive, from the user device, a further request, wherein the further request includes the authentication cookie or access token and a second user system time stamp associated with the system time of the user device; validate, the authentication cookie or access token included in the further request; in response to validating the authentication cookie or access token, determine, a time difference between the second user system time stamp plus the network delay and a current time of the session timer; and at least one of authorize, challenge, and deny, based on the time difference, the further request.

In this way, non-limiting embodiments or aspects of the present disclosure narrow access to only to intended, legitimate users, improve security to a greater extent, and/or reduce fraud. For example, non-limiting embodiments or aspects of the present disclosure may render any stolen authentication cookie and/or access token unusable from any malicious browser or application or through any bot attacks.

Referring now to FIGS. 1A and 1B, FIGS. 1A and 1B are diagrams of an example environment 100 in which devices, systems, methods, and/or products described herein, may be implemented. As shown in FIGS. 1A and 1B, environment 100 includes transaction processing network 101, which may include merchant system 102, payment gateway system 104, acquirer system 106, transaction service provider system 108, issuer system 110, user device 112, and/or communication network 114.

Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 via communication network 114 and/or communicating information and/or data to payment gateway system 104, acquirer system 106, transaction service provider system 108, issuer system 110, and/or user device 112 via communication network 114. For example, merchant system 102 may include a computing device, such as a server (e.g., server computer 120, etc.), a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 via communication network 114 and/or communicating information and/or data to merchant system 102, payment gateway system 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 via communication network 114 and/or communicating information and/or data to merchant system 102, payment gateway system 104, acquirer system 106, issuer system 110, and/or user device 112 via communication network 114. For example, transaction service provider system 108 may include a computing device, such as a server (e.g., a transaction processing server, server computer 120, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including transaction data.

Issuer system 110 may include one or more devices capable of receiving information and/or data from merchant system 102, payment gateway system 104, acquirer system 106, transaction service provider system 108, and/or user device 112 via communication network 114 and/or communicating information and/or data to merchant system 102, payment gateway system 104, acquirer system 106, transaction service provider system 108, and/or user device 112 via communication network 114. For example, issuer system 110 may include a computing device, such as a server (e.g., server computer 120, etc.), a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 via communication network 114 and/or communicating information and/or data to merchant system 102, payment gateway system 104, acquirer system 106, transaction service provider system 108, and/or issuer system 110 via communication network 114. For example, user device 112 may include a client device and/or the like.

As shown in FIG. 1B, in some non-limiting embodiments or aspects, user device 112 may include one or more applications associated with user device 112, such as an application stored, installed, and/or executed on user device 112 (e.g., a mobile device application, a web browser application, a native application for a mobile device, a mobile cloud application for a mobile device, an electronic wallet application, a peer-to-peer payment transfer application, a merchant application, an issuer application, etc.). For example, user device 112 may include a browser configured to access and display pages and files on the web and/or in an application server computer 120. As an example, server computer 120 may provide a website and/or an application accessible by user device 112 via the browser or a user client. For example, the website and/or application may be capable of being used by a user to conduct an electronic payment transaction with merchant system 102, transaction service provider system 108, and/or a banking transaction with issuer system 110 (e.g., via server computer 120 implemented by merchant system 102, transaction service provider system 108, and/or issuer system 110, etc.).

Communication network 114 may include one or more wired and/or wireless networks. For example, communication network 114 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIGS. 1A and 1B is provided as an example. There may be additional devices and/or systems, fewer devices and/or systems, different devices and/or systems, or differently arranged devices and/or systems than those shown in FIGS. 1A and 1B. Furthermore, two or more devices and/or systems shown in FIGS. 1A and 1B may be implemented within a single device and/or system, or a single device and/or system shown in FIGS. 1A and 1B may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
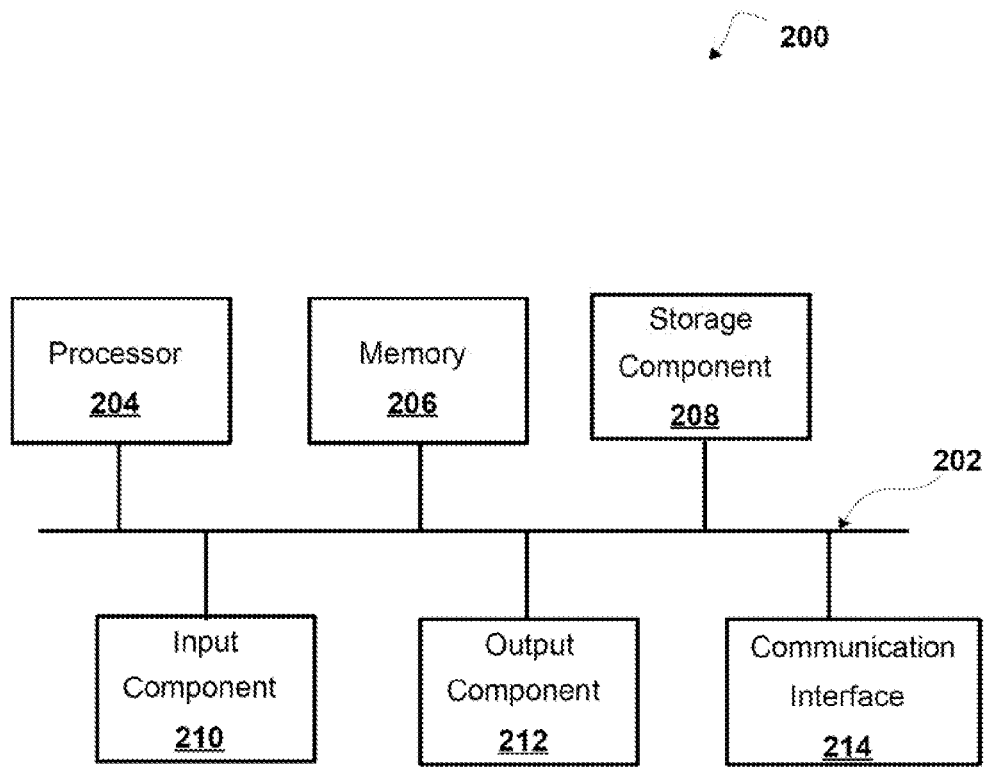
FIG. 2 is a diagram of non-limiting embodiments or aspects of components of one or more devices and/or one or more systems of FIGS. 1A and 1B.

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
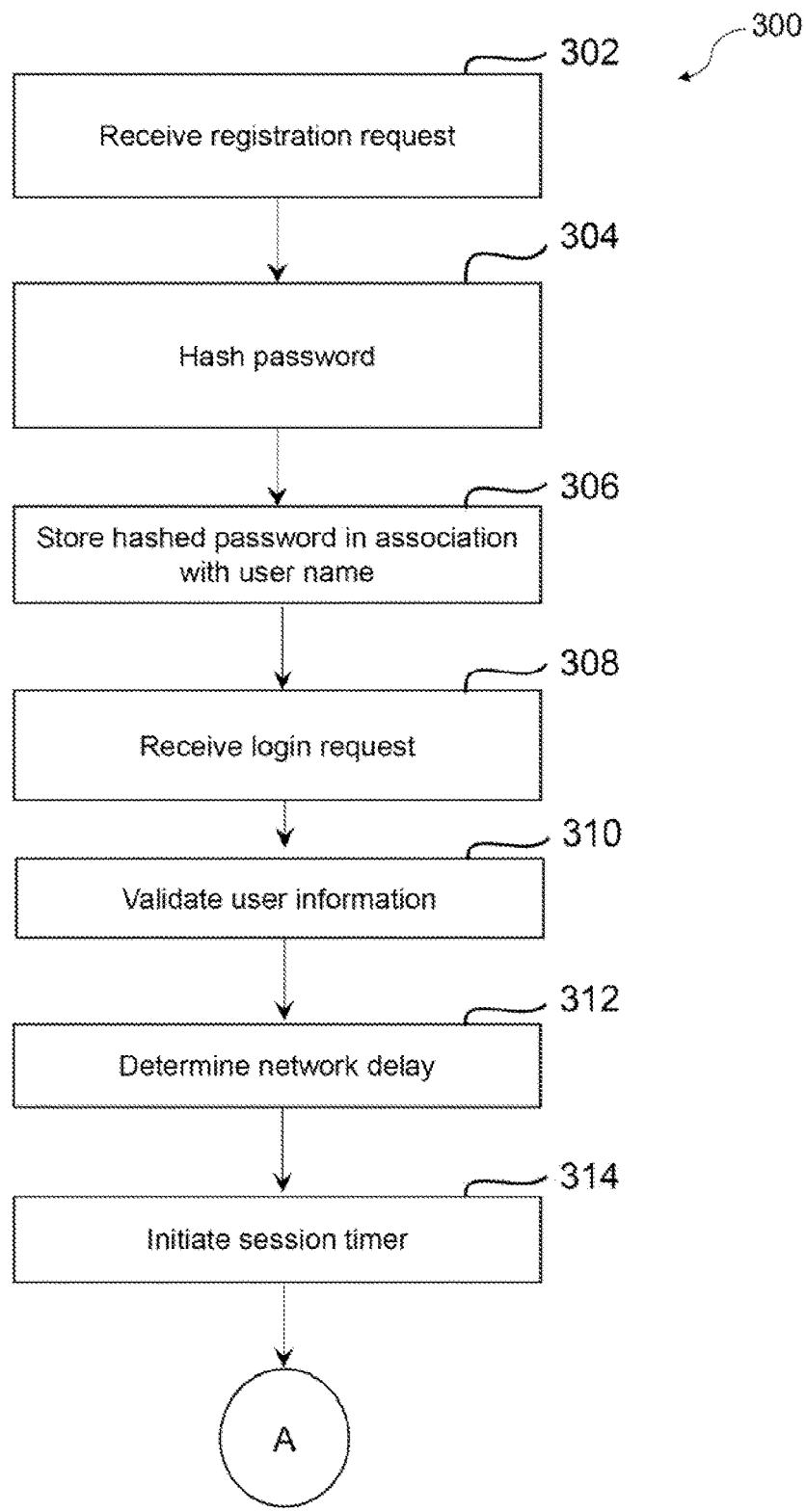
FIGS. 3A and 3B are a flowchart of non-limiting embodiments or aspects of a process for securing authentication cookies and access tokens.
Figure 3B:
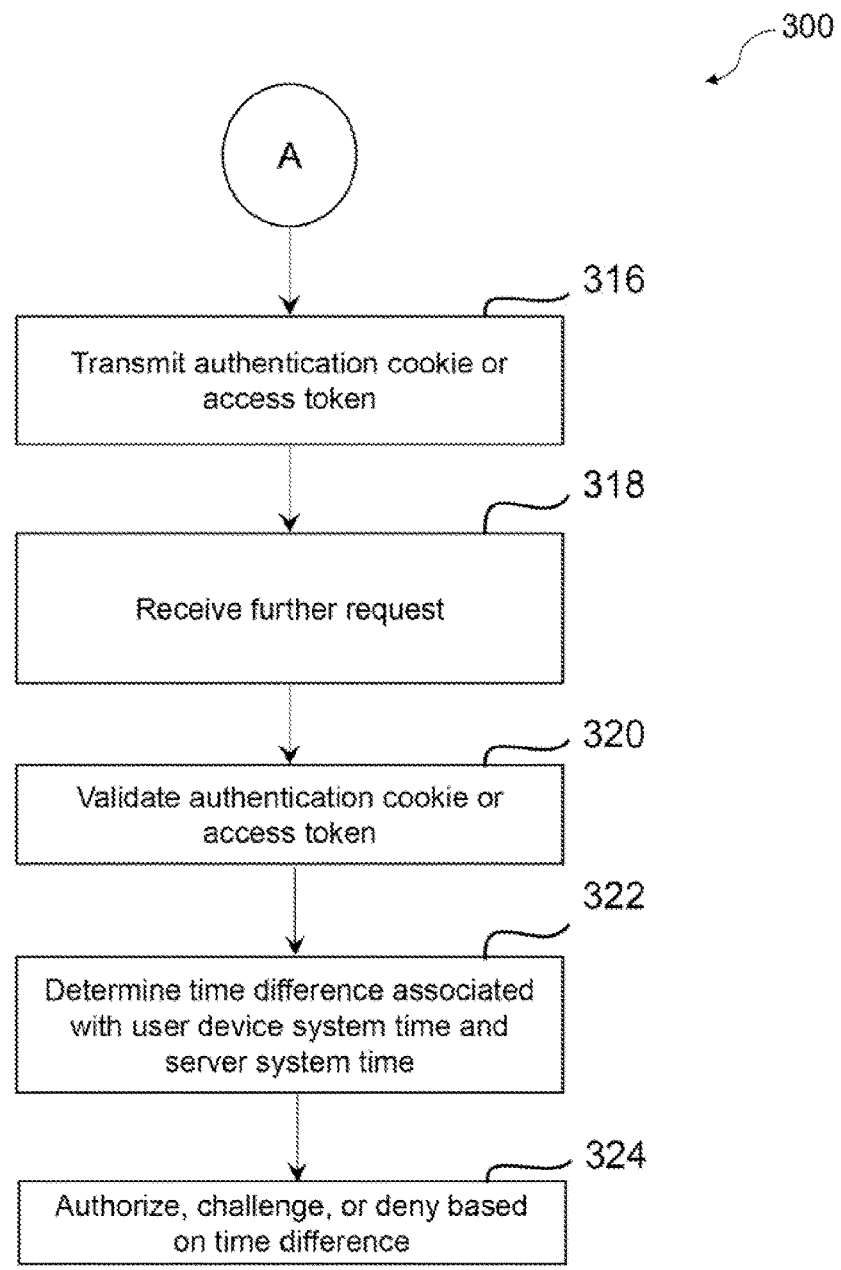

Referring now to FIGS. 3A and 3B, FIGS. 3A and 3B are a flowchart of non-limiting embodiments or aspects of a process 300 for securing authentication cookies and access tokens. In some non-limiting embodiments or aspects, one or more of the steps of process 300 may be performed (e.g., completely, partially, etc.) by merchant system 102 (e.g., one or more devices of merchant system 102, server computer 120, etc.). In some non-limiting embodiments or aspects, one or more of the steps of process 300 may be performed (e.g., completely, partially, etc.) by another device or a group of devices separate from or including merchant system 102, such as payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112 (e.g., one or more devices of a system of user device 112).

As shown in FIG. 3A, at step 302, process 300 includes receiving a registration request. For example, merchant system 102 (e.g., server computer 120, etc.) may receive, from user device 112, a registration request including user information. As an example, the user information may include a user name and a password. In such an example, the user name and the password may be associated with a user of user device 112.

As shown in FIG. 3A, at step 304, process 300 includes hashing a password. For example, merchant system 102 (e.g., server computer 120, etc.) may hash (e.g., using one or more hash function, etc.) the password included in the user information received from user device 112.

As shown in FIG. 3A, at step 306, process 300 includes storing a hashed password in association with a user name. For example, merchant system 102 (e.g., server computer 120, etc.) may store, in a database (e.g., a database associated with merchant system 102, a database associated with the server computer 120, etc.), the hashed password in association with the user name.

As shown in FIG. 3A, at step 308, process 300 includes receiving a login request. For example, merchant system 102 (e.g., server computer 120, etc.) may receive, from user device 112, a login request. As an example, the login request may include the user information, a first user system time stamp associated with a system time of user device 112, and/or a first server system time stamp associated with a system time of server computer 120. In such an example, the login request may include a HTTP request posted by a browser or client of user device 112 to server computer 120.

In some non-limiting embodiments or aspects, user device 112 may JavaScript or another client UI based script language to retrieve the first user system time stamp associated with a system time of user device 112 (e.g., a current user system timestamp, a current system time associated with user device 112, etc.) an epoch/Unix format, and which may be further encrypted by user device 112. For example, the browser or client application may choose an encryption algorithm, such as HMAC, RSA, and/or the like to encrypt the first user system time stamp. At a same time, user device 112 may use the JavaScript to invoke server computer 120 (e.g., to invoke the website or application server associated with merchant system 102 through REST GET API, etc.) to retrieve the first server system time stamp associated with a system time of server computer 120 (e.g., a current server system timestamp, a current system time associated with the server computer 120, etc.), which may be further encrypted. For example, the browser or client application and/or the website or application server may choose an encryption algorithm, such as HMAC, RSA, and/or the like to encrypt the first server system time stamp.

As shown in FIG. 3A, at step 310, process 300 includes validating user information. For example, merchant system 102 (e.g., server computer 120, etc.) may validate the user information. As an example, merchant system 102 (e.g., server computer 120, etc.) may validate the user information by hashing the password included in the login request, comparing the hashed password included in the login request to the hashed password stored in the database in association with the user name, and validating the user information in response to the hashed passwords matching each other. If the hashed passwords do not match each other, merchant system 102 (e.g., server computer 120, etc.) may not validate the user information and deny the user access by sending a 401 status code and ending the request.

As shown in FIG. 3A, at step 312, process 300 includes determining a network delay. For example, merchant system 102 (e.g., server computer 120, etc.) may, in response to validating the user information, determine a network delay equal to a second server system time stamp associated with the system time of server computer 120 at which the login request is received by server computer 120 minus the first server system time stamp. As an example, server computer 120 may decrypt the first user system time stamp and the first server system time stamp, hash the decrypted time stamps, store the hashed and/or decrypted time stamps in the database in association with the user name, and/or retrieve the second server system time stamp (e.g., a current system time associated with the server computer 120 at a time at which the login request is received by server computer 120, etc.). In such an example, the network delay may be associated with a network travel time of the login request.

Example Network Delay Calculation

If a value of the first user system time stamp is equal to Thursday, Oct. 15, 2020 3:50:00:786 AM GMT, a value of the first server system time stamp is equal to Wednesday, Oct. 14, 2020 10:50:00:786 PM GMT, and a value of the second server system time stamp is equal to Wednesday, Oct. 14, 2020 10:50:02:786 PM GMT, the network delay is equal to Wednesday, Oct. 14, 2020 10:50:02:786 PM GMT-Wednesday, Oct. 14, 2020 10:50:00:786 PM GMT, which is equal to 2 seconds. In such an example, a current user system time stamp at the time at which the login request is received by server computer 120 is equal to Thursday, Oct. 15, 2020 3:50:00:786 AM GMT plus 2 seconds, which is equal to Thursday, Oct. 15, 2020 3:50:02:786 AM GMT.

As shown in FIG. 3A, at step 314, process 300 includes initiating a session timer. For example, merchant system 102 (e.g., server computer 120, etc.) may initiate a session timer associated with user device 112 (e.g., associated with the user name, user device 112, and/or the browser/application associated with user device 112, etc.). In such an example, the session timer may be initiated from a time equal to the first user system time stamp plus the network delay.

Merchant system 102 (e.g., server computer 120, etc.) may initiate the session timer for a session associated with the user name-device-browser. As an example, merchant system 102 (e.g., server computer 120, etc.) may use a built in PHP application and/or Java application to initiate and maintain a session timer or clock for user devices. For example, merchant system 102 (e.g., server computer 120, etc.) may retrieve a current user system time (e.g., a current client or user device time, etc.) by invoking the timeclock application through a REST API and/or sql/no sql fetch. In such an example, merchant system 102 (e.g., server computer 120, etc.) may assign a random unique identifier for the combination of the user device and the browser associated with the user name. For example, for a user name ABC@email.com, merchant system 102 (e.g., server computer 120, etc.) may assign a device identifier of ABCDeviceId1234 (e.g., a unique but random identifier created by server computer 120 for this user device 112) and a browser identifier of ABCBrowser1234 (e.g., a unique but random browser identifier created by server computer 120 for this user-device browser).

As shown in FIG. 3B, at step 316, process 300 includes transmitting an authentication cookie or access token. For example, merchant system 102 (e.g., server computer 120, etc.) may transmit an authentication cookie or access token. As an example, merchant system 102 (e.g., server computer 120, etc.) may attach the authentication cookie or access token to a response cookie in a HTTP 200 OK success status response code returned to the client in response to the login request.

Merchant system 102 (e.g., server computer 120, etc.) may use an encrypted value of the user name, the device identifier, and/or the browser identifier as the authentication cookie or access token. For example, merchant system 102 (e.g., server computer 120, etc.) may generate, based on the user name, the device identifier, and/or the browser identifier, using an encryption code, the authentication cookie or access token. In such an example, the authentication cookie or access token may uniquely identify a session associated with the user name, user device, and/or browser combination associated with the validated user information/login. Merchant system 102 (e.g., server computer 120, etc.) may store, in the database, the authentication cookie or access token in association with the user name, the device identifier, and/or the browser identifier.

Merchant system 102 (e.g., server computer 120, etc.) may set an expiration time associated with the authentication cookie or access token (e.g., a date and time at which the authentication cookie or access token expires and can no longer be used to gain access to server computer 120, etc.). For example, the expiration time may limit a time period of the session associated with the user name, user device, and/or browser combination. Merchant system 102 (e.g., server computer 120, etc.) may store the authentication cookie or access token in the database in association with the expiration time, network delay, the user name, the device identifier, the browser identifier, and/or the hashed password.

As shown in FIG. 3B, at step 318, process 300 includes receiving a further request. For example, merchant system 102 (e.g., server computer 120, etc.) may receive, from user device 112, a further request. For example, the further request may include the authentication cookie or access token and a second user system time stamp associated with the system time of the user device. As an example, on any HTTP request from user device 112 subsequent to receiving the authentication cookie or access token from server computer 120, the JavaScript of the browser or client on user device 112 may automatically send the authentication cookie or access token and a current user system timestamp associated with a current system time of user device 112.

In some non-limiting embodiments or aspects, the authentication cookie or access token and a current user system timestamp associated with a current system time of user device 112 may be included in a HTTP request header of the further request. In some non-limiting embodiments or aspect, the authentication cookie or access token and a current user system timestamp associated with a current system time of user device 112 may be included as an additional encrypted field in the authentication cookie.

In some non-limiting embodiments or aspects, the further request may include one or more invalid random time stamps, and/or the second user system time stamp and the one or more invalid random time stamps may be encrypted with a predetermined encryption code. For example, the JavaScript may include one or more invalid look-alike random time stamps with the valid second user system time stamp with a predetermined encryption code, such as SHA-256, and/or the like, which only server computer 120 know. In this way, if the authentication cookie or access token is stolen, it is much more difficult for an attacker to understand the list of random timestamps and decrypt the time stamps within a time difference that satisfies a threshold time difference (e.g., within 5 seconds, etc.), even for a savvy and adapting fraudster/hacker.

As shown in FIG. 3B, at step 320, process 300 includes validating an authentication cookie or access token. For example, merchant system 102 (e.g., server computer 120, etc.) may validate the authentication cookie or access token included in the further request. As an example, merchant system 102 (e.g., server computer 120, etc.) may validate the authentication cookie or access token included in the further request by comparing the authentication cookie or access token included in the further request to the authentication cookie or access token stored in the database in association with the expiration time, the user name, the device identifier, the browser identifier, and/or the hashed password and validating the authentication cookie or access token in response to the cookies or tokens matching each other. If the cookies or tokens do not match each other, merchant system 102 (e.g., server computer 120, etc.) may not validate the authentication cookie or access token and deny the user access by sending a 401 status code and ending the request.

As shown in FIG. 3B, at step 322, process 300 includes determining a time difference associated with a user device system time and a server system time. For example, in response to validating the authentication cookie or access token, merchant system 102 (e.g., server computer 120, etc.) may determine a time difference between the second user system time stamp plus the network delay and a current time of the session timer. As an example, merchant system 102 (e.g., server computer 120, etc.) may decrypt the second user system time stamp included in the further message, account for network delay by adding the network delay to the second user system time stamp to determine a derived user system time stamp, and/or compare the derived user system time stamp to a current time of the session timer associated with the user name, the device identifier, and/or the browser identifier associated with the further request (e.g., a time of the session timer at which the further request is received by server computer 120, etc.) to determine a time difference therebetween.

As shown in FIG. 3B, at step 324, process 300 includes authorizing, challenging, and/or denying a further request based on a time difference. For example, merchant system 102 (e.g., server computer 120, etc.) may at least one of authorize, challenge, and deny, based on the time difference, the further request. As an example, merchant system 102 (e.g., server computer 120, etc.) may determine whether the time difference satisfies at least one threshold time. In such an example, in response to determining that the time difference satisfies the at least one threshold time, merchant system 102 (e.g., server computer 120, etc.) may authorize the further request (e.g., allow access to the requested page or data to the browser of user device 112, etc.). In such an example, in response to determining that the time difference fails to satisfy the at least one threshold time, merchant system 102 (e.g., server computer 120, etc.) may deny the further request (e.g., deny the user access by sending a 401 status code and ending the request, etc.).

In some non-limiting embodiments or aspects, the at least one threshold time may include a first threshold time and a second threshold time, and in response to determining that the time difference satisfies the first threshold time and fails to satisfy the second threshold time, merchant system 102 (e.g., server computer 120, etc.) may challenge the further request by performing a two-factor authentication process with the user device.

Example Time Difference Calculation and Access Decision

Table 1 provides example responses or actions (e.g., authorize/allow, challenge, deny, etc.) from merchant system 102 (e.g., server computer 120, etc.) for an example in which a value of the second user system time stamp included in the further message (e.g., a decrypted end user-device time stamp, etc.) is Thursday, Oct. 15, 2020 4:50:00:786 AM GMT, the network delay is 3 seconds, and the current time of the session timer (e.g., a time of the session timer at which the further request is received by server computer 120, etc.) is Thursday, Oct. 15, 2020 4:50:03:786 AM GMT. As shown in Table 1, merchant system 102 (e.g., server computer 120, etc.) may determine whether to authorize/allow, challenge, or deny the further request based on a value of the time difference. For example, if the time difference is less than 5 seconds (e.g., an arbitrary value-small value to make any fraudster impossible to change the time stamp in HTTP requests, etc.), merchant system 102 (e.g., server computer 120, etc.) may allow or authorize a transaction associated with the further request, if the time difference is 8 seconds or greater, merchant system 102 (e.g., server computer 120, etc.) may automatically deny the transaction, and if the time difference is less than 8 seconds and 5 seconds or greater, merchant system 102 (e.g., server computer 120, etc.) may challenge the transaction.

TABLE 1

| Second user system time stamp (decrypted end user-device time stamp) (A) | Current time of Session Timer (B) | Time Difference = Absolute Value of (A – B) in seconds | Access/HTTP Code |
| --- | --- | --- | --- |
| Thursday, Oct. 15, 2020 4:50:03:786 AM GMT | Thursday, Oct. 15, 2020 4:50:02:786 AM GMT | 1 | ALLOW -200 Success |
|  | Thursday, Oct. 15, 2020 4:50:03:786 AM GMT | 0 | ALLOW -200 Success |
|  | Thursday, Oct. 15, 2020 4:50:04:786 AM GMT | 1 | ALLOW -200 Success |
|  | Thursday, Oct. 15, 2020 4:50:05:786 AM GMT | 2 | ALLOW -200 Success |
|  | Thursday, Oct. 15, 2020 4:50:06:786 AM GMT | 3 | ALLOW -200 Success |
|  | Thursday, Oct. 15, 2020 4:50:07:786 AM GMT | 4 | ALLOW -200 Success |
|  | Thursday, Oct. 15, 2020 4:50:08:786 AM GMT | 5 | CHALLENGE -200 Success (50% chance that request could still be from the legit user-device. In this case server go ask user to enter OTP or the original password as a Two factor authentication) |
|  | Thursday, Oct. 15, 2020 4:50:09:786 AM GMT | 6 | CHALLENGE -200 Success (50% chance that request could still be from the legit user-device. In this case server go ask user to enter OTP or the original password as a Two factor authentication) |
|  | Thursday, Oct. 15, 2020 4:50:09:786 AM GMT | 7 | CHALLENGE -200 Success (50% chance that request could still be from the legit user-device. In this case server go ask user to enter OTP or the original password as a Two factor authentication) |
|  | Thursday, Oct. 15, 2020 4:50:10:786 AM GMT | 8 | DENY - 401 Unauthorized (Request is from a different device-browser or a script bot attack) |

TABLE 1-continued

| Second user system time stamp (decrypted end user-device time stamp) (A) | Current time of Session Timer (B) | Time Difference = Absolute Value of (A − B) in seconds | Access/HTTP Code |
|---|---|---|---|
| | Thursday, Oct. 15, 2020 4:50:11:786 AM GMT | 9 | DENY - 401 Unauthorized (Request is from a different device-browser or a script bot attack) |
| | Thursday, Oct. 15, 2020 4:55:09:786 AM GMT | 306 | DENY - 401 Unauthorized (Request is from a different device-browser or a script bot attack) |
| | Thursday, Oct. 15, 2020 5:30:09:786 AM GMT | 2400 | DENY - 401 Unauthorized (Request is from a different device-browser or a script bot attack) |
| | Thursday, Oct. 15, 2020 6:00:09:786 AM GMT | 4200 | DENY - 401 Unauthorized (Request is from a different device-browser or a script bot attack) |
| | Thursday, Oct. 15, 2020 6:30:09:786 AM GMT | 6000 | DENY - 401 Unauthorized (Request is from a different device-browser or a script bot attack) |
| | Thursday, Oct. 15, 2020 7:30:09:786 AM GMT | 9600 | DENY - 401 Unauthorized (Request is from a different device-browser or a script bot attack) |

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
    receiving, with a server including at least one processor, from a user device, a login request, wherein the login request includes user information, a first user system time stamp associated with a system time of the user device, and a first server system time stamp associated with a system time of the server;
    validating, with the server, the user information;
    in response to validating the user information, determining, with the server, a network delay, wherein the network delay is equal to a second server system time stamp associated with the system time of the server at which the login request is received by the server minus the first server system time stamp;
    initiating, with the server, a session timer associated with the user device, wherein the session timer is initiated from a time equal to the first user system time stamp plus the network delay;
    transmitting, with the server, to the user device, an authentication cookie or an access token;
    receiving, with the server, from the user device, a further request, wherein the further request includes the authentication cookie or the access token and a second user system time stamp associated with the system time of the user device;
    validating, with the server, the authentication cookie or the access token included in the further request;
    in response to validating the authentication cookie or the access token, determining, with the server, a time difference between the second user system time stamp plus the network delay and a current time of the session timer; and
    at least one of authorizing, challenging, and denying, with the server, based on the time difference, the further request.

2. The computer-implemented method of claim 1, further comprising:
    receiving, with the server, from the user device, a registration request, wherein the registration request includes the user information, wherein the user information includes a user name and a password;
    hashing, with the server, the password; and
    storing, with the server, in a database, the hashed password in association with the user name,
    wherein the server validates the user information by hashing the password included in the login request, comparing the hashed password included in the login request to the hashed password stored in the database in association with the user name, and validating the user information in response to the hashed passwords matching each other.

3. The computer-implemented method of claim 2, further comprising:
    generating, with the server, a device identifier associated with the user device;
    generating, with the server, a browser or client identifier associated with a browser or client of the user device;
    generating, with the server, based on the user name, the device identifier, and the browser identifier, using an encryption code, the authentication cookie or the access token; and storing, with the server, in the database, the authentication cookie or the access token in association with the user name, the device identifier, and the browser identifier, wherein the server validates the authentication cookie or the access token included in the further request by comparing the authentication cookie or the access token included in the further request to the authentication cookie or the access token stored in the database in association with the user name, the device identifier, and the browser identifier.

4. The computer-implemented method of claim 1, wherein the at least one of authorizing, challenging, and denying based on the time difference, the further request further includes:

determining whether the time difference satisfies at least one threshold time;

in response to determining that the time difference satisfies the at least one threshold time, authorizing the further request; and in response to determining that the time difference fails to satisfy the at least one threshold time, denying the further request.

5. The computer-implemented method of claim 4, wherein the at least one threshold time includes a first threshold time and a second threshold time, and wherein the at least one of authorizing, challenging, and denying based on the time difference, the further request further includes:

in response to determining that the time difference satisfies the first threshold time and fails to satisfy the second threshold time, challenging the further request by performing a two-factor authentication process with the user device.

6. The computer-implemented method of claim 1, wherein the further request includes one or more invalid random time stamps, and wherein the second user system time stamp and the one or more invalid random time stamps are encrypted with a predetermined encryption code.

7. A system, comprising:

a server including at least one hardware processor programmed and/or configured to:

receive, from a user device, a login request, wherein the login request includes user information, a first user system time stamp associated with a system time of the user device, and a first server system time stamp associated with a system time of the server;

validate the user information;

in response to validating the user information, determine, a network delay, wherein the network delay is equal to a second server system time stamp associated with the system time of the server at which the login request is received by the server minus the first server system time stamp;

initiate a session timer associated with the user device, wherein the session timer is initiated from a time equal to the first user system time stamp plus the network delay;

transmit, to the user device, an authentication cookie or an access token;

receive, from the user device, a further request, wherein the further request includes the authentication cookie or the access token and a second user system time stamp associated with the system time of the user device;

validate the authentication cookie or the access token included in the further request;

in response to validating the authentication cookie or the access token, determine a time difference between the second user system time stamp plus the network delay and a current time of the session timer; and at least one of authorize, challenge, and deny, based on the time difference, the further request.

8. The system of claim 7, wherein the server including the at least one processor is further programmed and/or configured to:

receive, from the user device, a registration request, wherein the registration request includes the user information, wherein the user information includes a user name and a password;

hash the password; and store, in a database, the hashed password in association with the user name, wherein the server including the at least one processor validates the user information by hashing the password included in the login request, comparing the hashed password included in the login request to the hashed password stored in the database in association with the user name, and validating the user information in response to the hashed passwords matching each other.

9. The system of claim 8, wherein the server including the at least one processor is further programmed and/or configured to:

generate a device identifier associated with the user device;

generate a browser or client identifier associated with a browser or client of the user device;

generate, based on the user name, the device identifier, and the browser identifier, using an encryption code, the authentication cookie or the access token; and store, in the database, the authentication cookie or the access token in association with the user name, the device identifier, and the browser identifier, wherein the server including the at least one processor validates the authentication cookie or the access token included in the further request by comparing the authentication cookie or the access token included in the further request to the authentication cookie or the access token stored in the database in association with the user name, the device identifier, and the browser identifier.

10. The system of claim 7, wherein the server including the at least one processor is further programmed and/or configured to:

determine whether the time difference satisfies at least one threshold time;

in response to determining that the time difference satisfies the at least one threshold time, authorize the further request; and in response to determining that the time difference fails to satisfy the at least one threshold time, deny the further request.

11. The system of claim 10, wherein the at least one threshold time includes a first threshold time and a second threshold time, and wherein the server including the at least one processor is further programmed and/or configured to:

in response to determining that the time difference satisfies the first threshold time and fails to satisfy the second threshold time, challenge the further request by performing a two-factor authentication process with the user device.

12. The system of claim 7, wherein the further request includes one or more invalid random time stamps, and wherein the second user system time stamp and the one or more invalid random time stamps are encrypted with a predetermined encryption code.

13. A computer program product comprising at least one non-transitory computer-readable medium including program instructions that, when executed by at least one processor, cause the at least one processor to:
   receive, from a user device, a login request, wherein the login request includes user information, a first user system time stamp associated with a system time of the user device, and a first server system time stamp associated with a system time of a server;
   validate the user information;
   in response to validating the user information, determine, a network delay, wherein the network delay is equal to a second server system time stamp associated with the system time of the server at which the login request is received by the server minus the first server system time stamp;
   initiate a session timer associated with the user device, wherein the session timer is initiated from a time equal to the first user system time stamp plus the network delay;
   transmit, to the user device, an authentication cookie or an access token;
   receive, from the user device, a further request, wherein the further request includes the authentication cookie or the access token and a second user system time stamp associated with the system time of the user device;
   validate, the authentication cookie or the access token included in the further request;
   in response to validating the authentication cookie or the access token, determine, a time difference between the second user system time stamp plus the network delay and a current time of the session timer; and
   at least one of authorize, challenge, and deny, based on the time difference, the further request.

14. The computer program product of claim 13, wherein the program instructions further cause the at least one processor to:
   receive, from the user device, a registration request, wherein the registration request includes the user information, wherein the user information includes a user name and a password;
   hash the password;
   store, in a database, the hashed password in association with the user name; and
   validate the user information by hashing the password included in the login request, comparing the hashed password included in the login request to the hashed password stored in the database in association with the user name, and validating the user information in response to the hashed passwords matching each other.

15. The computer program product of claim 14, wherein the program instructions further cause the at least one processor to:
   generate a device identifier associated with the user device;
   generate a browser or client identifier associated with a browser or client of the user device;
   generate, based on the user name, the device identifier, and the browser identifier, using an encryption code, the authentication cookie or the access token;
   store, in the database, the authentication cookie or the access token in association with the user name, the device identifier, and the browser identifier; and
   validate the authentication cookie or the access token included in the further request by comparing the authentication cookie or the access token included in the further request to the authentication cookie or the access token stored in the database in association with the user name, the device identifier, and the browser identifier.

16. The computer program product of claim 13, wherein the program instructions further cause the at least on processor to:
   determine whether the time difference satisfies at least one threshold time;
   in response to determining that the time difference satisfies the at least one threshold time, authorize the further request; and
   in response to determining that the time difference fails to satisfy the at least one threshold time, deny the further request.

17. The computer program product of claim 16, wherein the at least one threshold time includes a first threshold time and a second threshold time, and wherein the program instructions further cause the at least one processor to:
   in response to determining that the time difference satisfies the first threshold time and fails to satisfy the second threshold time, challenge the further request by performing a two-factor authentication process with the user device.

18. The computer program product of claim 13, wherein the further request includes one or more invalid random time stamps, and wherein the second user system time stamp and the one or more invalid random time stamps are encrypted with a predetermined encryption code.

\* \* \* \* \*